United States Patent [19]

Vasilos

[11] Patent Number: 4,546,032
[45] Date of Patent: Oct. 8, 1985

[54] FIBER REINFORCED CARBON/CARBON COMPOSITE STRUCTURE WITH TAILORED DIRECTIONAL SHEAR STRENGTH PROPERTIES

[75] Inventor: Thomas Vasilos, Winthrop, Mass.

[73] Assignee: The United States of America as represented by the Secretary of the Air Force, Washington, D.C.

[21] Appl. No.: 562,369

[22] Filed: Dec. 16, 1983

[51] Int. Cl.[4] ............................................. B32B 7/08
[52] U.S. Cl. .................................. 428/223; 428/246; 428/251; 428/252; 428/257; 428/408
[58] Field of Search ............... 428/246, 251, 257, 252, 428/408, 223

[56] References Cited

U.S. PATENT DOCUMENTS

| | | | |
|---|---|---|---|
| 3,837,985 | 9/1974 | Chase | 156/91 |
| 4,237,175 | 12/1980 | Hobayashi | 428/902 |
| 4,257,835 | 3/1981 | Bompard | 428/238 |
| 4,328,272 | 5/1982 | Maistre | 428/902 |
| 4,410,577 | 10/1983 | Palmer et al. | 428/902 |

FOREIGN PATENT DOCUMENTS

| | | | |
|---|---|---|---|
| 2261024 | 6/1973 | Fed. Rep. of Germany | 428/223 |
| 545483 | 3/1977 | U.S.S.R. | 428/223 |

Primary Examiner—James J. Bell
Attorney, Agent, or Firm—Donald J. Singer; Charles E. Bricker

[57] ABSTRACT

Fiber reinforced composite with five directions of fiber orientation comprising multiple planar fabric layers (16A, 16B, 16C, 16D) adjacent to each other with warp (W) and fill (F) fibers of one or more of such groups offset relative to the fibers of the others, a lateral array (extending perpendicular to the planes) of piercing fibers (5D) utilizing carbon/carbon, as reinforcement and matrix materials, providing a composite with tailored shear strength and stiffness in a selected anisotropy to meet the needs of specific thermostructural applications.

6 Claims, 6 Drawing Figures

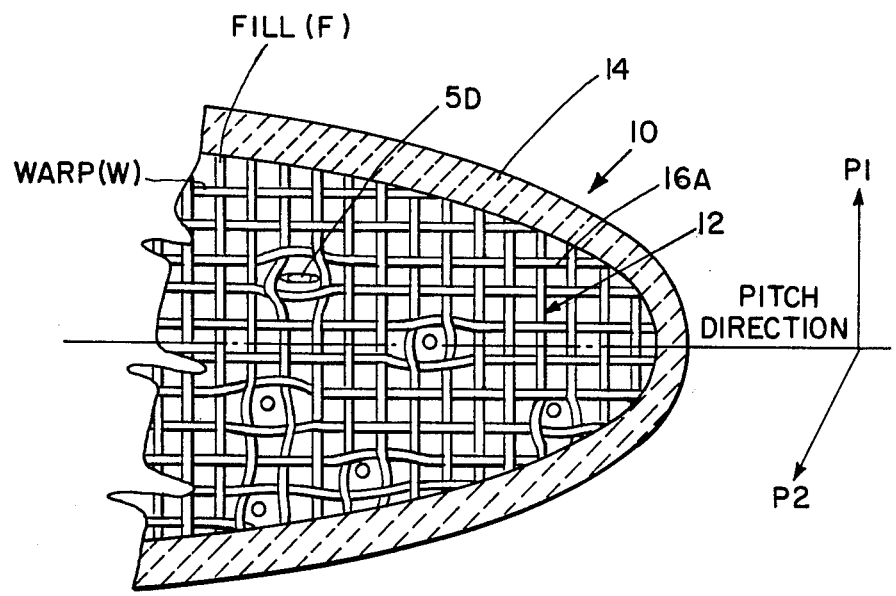
*Fig. 1.*
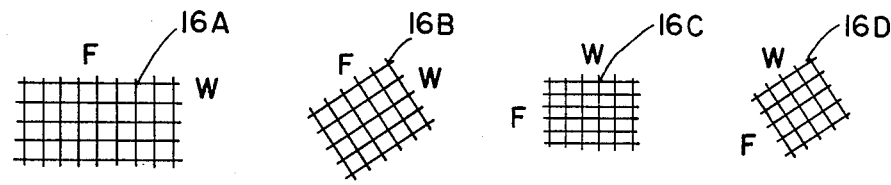
*Fig. 1A.*   *Fig. 1B.*   *Fig. 1C.*   *Fig. 1D.*

FIBER REINFORCED CARBON/CARBON COMPOSITE STRUCTURE WITH TAILORED DIRECTIONAL SHEAR STRENGTH PROPERTIES

This application describes an invention made or partially made in the course of work under a U.S. Government contract, viz Department of the Air Force Contract No. F33615-79-C-5070.

BACKGROUND OF THE INVENTION

The invention relates to fiber reinforced composite structures with improved directional shear strength properties and to a method for manufacturing such composite structures.

Fiber composites do not display optimum shear strength properties in many applications, particularly where high temperature and high shear loading are combined, e.g., aerospace and turbine or other combustion engine usages. Rather, present composites exhibit difficulty in withstanding the demanding thermostructural requirements placed upon them in such usages.

Several alternative material methods of construction fabrication approaches, including knit 2D/3D constructions or redesigning the end use application have been utilized. However, each of these have inherent deficiencies in their constructions—relative to the inherent requirements of such structures—in terms of providing: resistance to in-process delamination, an optimum balance of material properties needed for in-use application, a mechanism for venting (outgassing) of volatiles generated between plies during the densification process, and ease of use of normal design configurations.

It is therefore a principal object of this invention to provide a fabric composite which exhibits enhanced tailored anisotropic shear strength properties consistent with meeting the other simultaneous requirements of such structures.

It is a further object of this invention to provide such composite which is suitable for applications such as for rocket and aircraft components, e.g., nose cones, parts for turbine and other combustion engines, and other thermostructural applications.

A further object of this invention is to provide constructions capable of sustaining fabrication (lay-up and/or molding) processing, resin impregnation and subsequent carbonization and graphitization processing without inducing wrinkles, fiber distortion, and/or delamination.

A further object of this invention is to provide a method for constructing such composite structures.

A further object of this invention is to provide an effective use of optimum warp to fill ratios of fabric.

SUMMARY OF THE INVENTION

This invention features a fiber reinforced composite and a method for making such a composite. A plurality of elongate fabric segments, each including a woven arrangement of continuous yarns or monofilaments in orthogonal warp and fill orientations to define a planar woven fabric, are laid up on parallel adjacent planes of such fabrics.

The patterns of fill and warp of successive planes are varied relative to each other to establish selected anisotropy in the parallel planes. Additionally, yarns are inserted perpendicular to such planes to establish a fifth dimension of high strength.

The fibers used in this invention include typically multi-filament continuous yarns, although monofilaments may be utilized. Continuous yarns as used herein should be understood to include both continuous filament and staple filament yarn. Such yarns may be composed of carbon or of carbon precursors. The composite's matrix for the carbon fabric may comprise a carbon matrix. The invention is also applicable to fibers of graphite, glass, quartz, or other suitable materials and to other matrix materials.

In a preferred embodiment, warp threads of different planes have 0, 45, 90, and 135 degree orientations relative to each other in a variety of asymmetrical sequences, e.g., 0-45-135-0-0-135-0-0. In this example, the sequence is not only asymmetrical, but also tailored heavily to favor a spreading of zero axis anisotropy. Other intervals than multiples of 45 degrees can be utilized. Where warp and fill fibers and denier are identical, $0 = 90$ and $45 = 135$ for all practical purposes. In most cases, warp and fill are different.

The fifth (cross-planar) dimension of composite shear strength enhancement is provided by pushing steel rods through the array of woven planar fabrics. The rods are displaced by pultruded rods (carbon yarns in extruded resin coverings).

Preferably, one or more applications of suitable resins may be made in liquid form and cured to impregnate the five dimensional, multi-planar fabric with a solid resin matrix. This is done through successive cycles of pitch-resin infiltration. Heating at proper levels serves to carbonize and graphitize the resin matrix.

The angled fibers (e.g., 45 and 135 degreeoriented fibers) reduce fiber population in the axial (zero degree) direction. To compensate this, a fabric with a warp to fill ratio of at least 1.5:1 and up to, as a practical matter, 4:1—preferably 2:1—is used to maintain tensile strength in the axial direction of the finished product. Such high warp to fill fabric should comprise a majority of the layers distributed through the stack.

Other objects, features, and advantages of the invention will be apparent from the following detailed description of preferred embodiments with reference therein to the accompanying drawing in which:

BRIEF DESCRIPTION OF THE DRAWING

FIG. 1 is a cross-sectional view of a nose cone rib illustrating utilization of a preferred embodiment of the invention;

FIGS. 1A–1D are schematic views of configurations of warp and fill in adjacent fabric layers of the rib of FIG. 1.

DETAILED DESCRIPTION OF THE PREFERRED EMBODIMENTS

Figure 2:
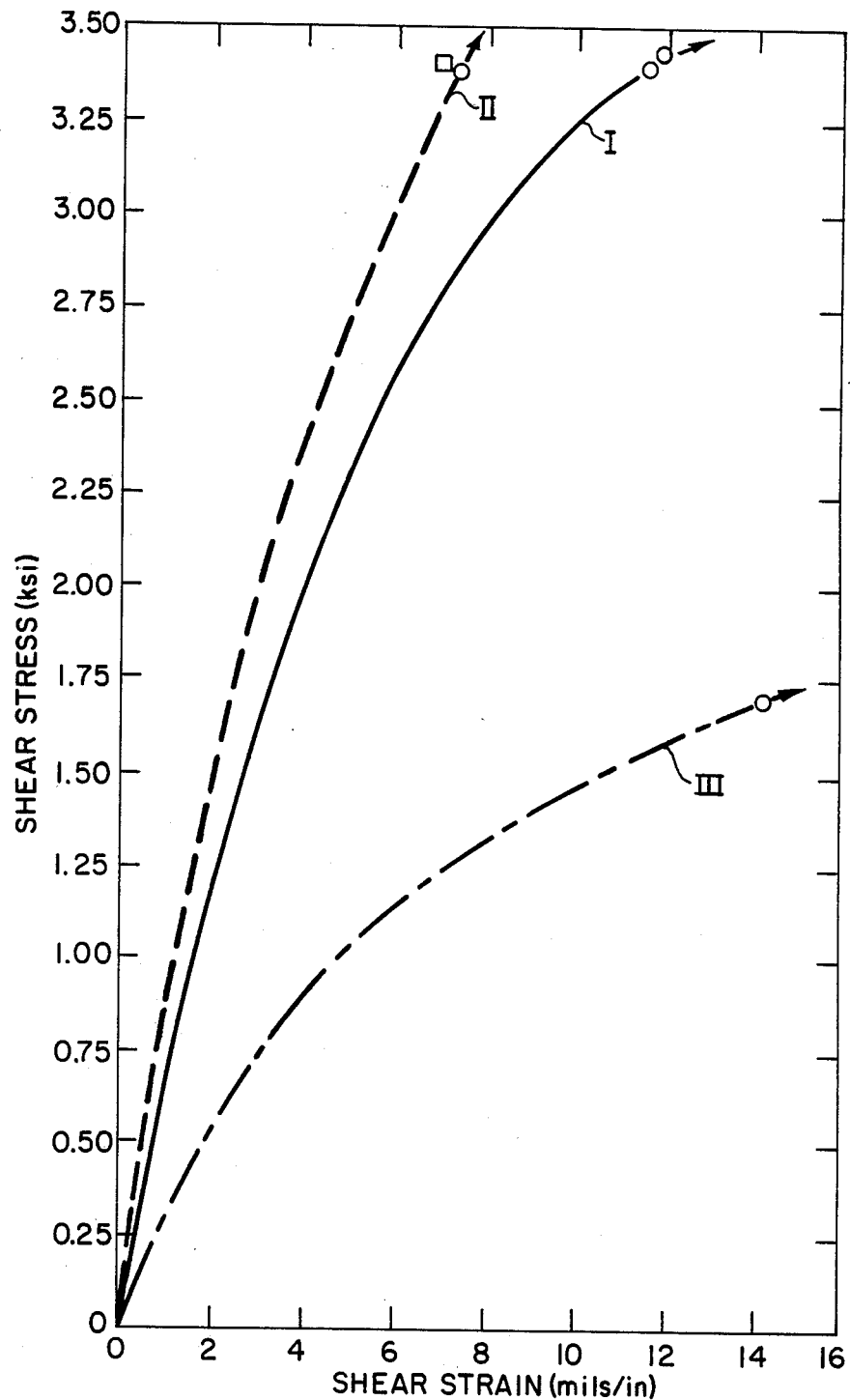
FIG. 2 is a stress-strain chart of the in-plane shear resistance for carbon/carbon products made in accordance with the invention.

The process of U.S. Pat. No. 4,218,276 for making 3D fibers is used in practice of the present invention. Specifics of fiber weaving, insertion of pultruded rods piercing the array of planar fabrics, and other aspects of state of the art of fabric construction are taught in said U.S. patent. See also U.S. Pat. Nos. 2,124,668; 2,377,650; 2,401,990; 2,960,424; 3,629,049; 3,897,582; 4,219,597; 4,237,175; 4,252,588; 4,257,835; 4,329,743; and 4,336,296. The disclosures of all the foregoing patents, exemplary of the knowledge of those skilled in the art, are incorporated herein by reference as though stated at length herein.

FIG. 1 shows a rocket nose cone end-use application illustrating the alignment of the median plane of a multiplanar fabric array as the pitch plane of the rocket. The nose cone is indicated at 10 and comprises a basic rib 12 aligned in the pitch plane of the vehicle containing the cone. Up and down pitch directions are indicated by arrows P1 and P2. A refractory coating shell 14 (with substrates and the like omitted from the drawing) surrounds the rib ends.

The rib 12 comprises a stack of adjacent planar fabrics (a median, one of which, 16A, is shown in the drawing). The warp (W) and fill (F) threads are shown in FIG. 1 and that showing is repeated in line form in FIG. 1A. Adjacent fabrics 16B, 16C, and 16D are shown in FIGS. 1B, 1C, and 1D. The fill and warp threads are incrementally adjusted by 45 degrees from layer to layer to establish a repetitive pattern of warp and fill directions relative to zero degrees (the longitudinal axis of the vehicle, vectoring forward) of:

|   | Warp | Fill |
|---|------|------|
| A | 0    | 90   |
| B | 45   | 135  |
| C | 90   | 0    |
| D | 135  | 45   |

Where warp and fill patterns are identical, the sequence can be reduced to:

|   | Warp | Fill |
|---|------|------|
| A | 0    | 90   |
| B | 45   | 135  |
| C | 0    | 90   |
| D | 45   | 135  |

In some instances, the pattern can be limited to a more occasional reinforcement at 45 and/or 135 e.g.:

|   | Warp | Fill |
|---|------|------|
| A | 0    | 90   |
| B | 0    | 90   |
| C | 0    | 90   |
| D | 0    | 90   |
| E | 45   | 135  |
| F | 0    | 90   |
| G | 0    | 90   | or a greater concentration on the off-longitudinal axis, e.g.:

|   | Warp | Fill |
|---|------|------|
| A | 45   | 135  |
| B | 45   | 135  |
| C | 0    | 90   |
| D | 45   | 135  |
| E | 45   | 135  |
| F | 0    | 90   |

The immediately preceding example might be varied to compensate different warp and fill properties, e.g.:

|   | Warp | Fill |
|---|------|------|
| A | 45   | 135  |
| B | 135  | 45   |
| C | 0    | 90   |
| D | 90   | 0    |
| E | 45   | 135  |
| F | 135  | 45   |

Yarns providing lateral strength, indicated at 5D in FIG. 1, are inserted according to the process and using apparatus disclosed in the foregoing referenced patents. The 5D yarns are understood to be present in all the alternate configures of A, B, C, D, etc. Also omitted from the drawing is the resin precursor matrix surrounding the fiber reinforcement.

The A, B, C pattern variations are established by programmed offsets in the weaving equipment.

In a non-limiting example of practice of a preferred embodiment of the invention, a structure was made using fibrous carbon yarns by alternating first and third layers as shown in FIG. 1A with a middle second layer as shown in FIG. 1B, and piercing with z-axis yarns. The laminate was compacted by pressing, impregnated with a resin or pitch matrix, carbonized and densified by HiPIC (high pressure impregnation carburization), and graphitized at 2300 degrees C. This composite is labelled "I." A similar composite labelled "II" was made using in the first, second, and third layers a 2:1 ratio (warp to fill) fabric. Shear stress-strain behavior was measured under torsion loading and is plotted in FIG. 2. Also shown are the results of similar testing on a sample III made from 3D processing as in the above referenced patents.

It is seen that stiffness and shear strength of I and II are enhanced compared to III by factors of over 5× for shear modulus and 3× for strength.

It is evident that those skilled in the art, once given the benefit of the foregoing disclosure, may now make numerous other uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirt and scope of the appended claims.

I claim:

1. An improved fiber composite article with tailored multi-directional shear strength comprising a repetitive array of means defining a first planar fabric layer including a plurality of elongate flexible warp direction fibers in a zero degree orientation woven with orthogonal fill fibers, means defining a second planar fabric layer, adjacent to the first, with its warp and fill directions offset from those of the first layer, means defining an array of third dimension fibers essentially perpendicular to the plane of the fabric layers piercing the fabric layers, and means defining a matrix impregnated throughout the array.

2. An article in accordance with claim 1 wherein said pattern comprises layers with 45 degree incremental offsets of warp and fill of a given layer relative to an adjacent layer in said array.

3. An article in accordance with claim 1 wherein the shear strength of the composite (relative to loading applied perpendicular to said zero orientation) is at least twice the shear strength of a directly comparable array of non-offset warp and fill directions from layer to layer.

4. An article in accordance with claim 1 wherein there are at least fifty such fabric layers with at least 10 percent of such layers having different warp and fill orientations relative to other layers of the array.

5. An article in accordance with claim 1 wherein a majority of said layers comprise fabrics of warp to fill ratio of at least 5:1.

6. An article in accordance with claim 1 with a warp to fill ratio in said majority of layers of about 2:1.

* * * * *